Nov. 18, 1930.  A. O. GOLDSTEIN  1,782,296
ICE SHAVING DEVICE
Filed Aug. 16, 1929   2 Sheets-Sheet 1
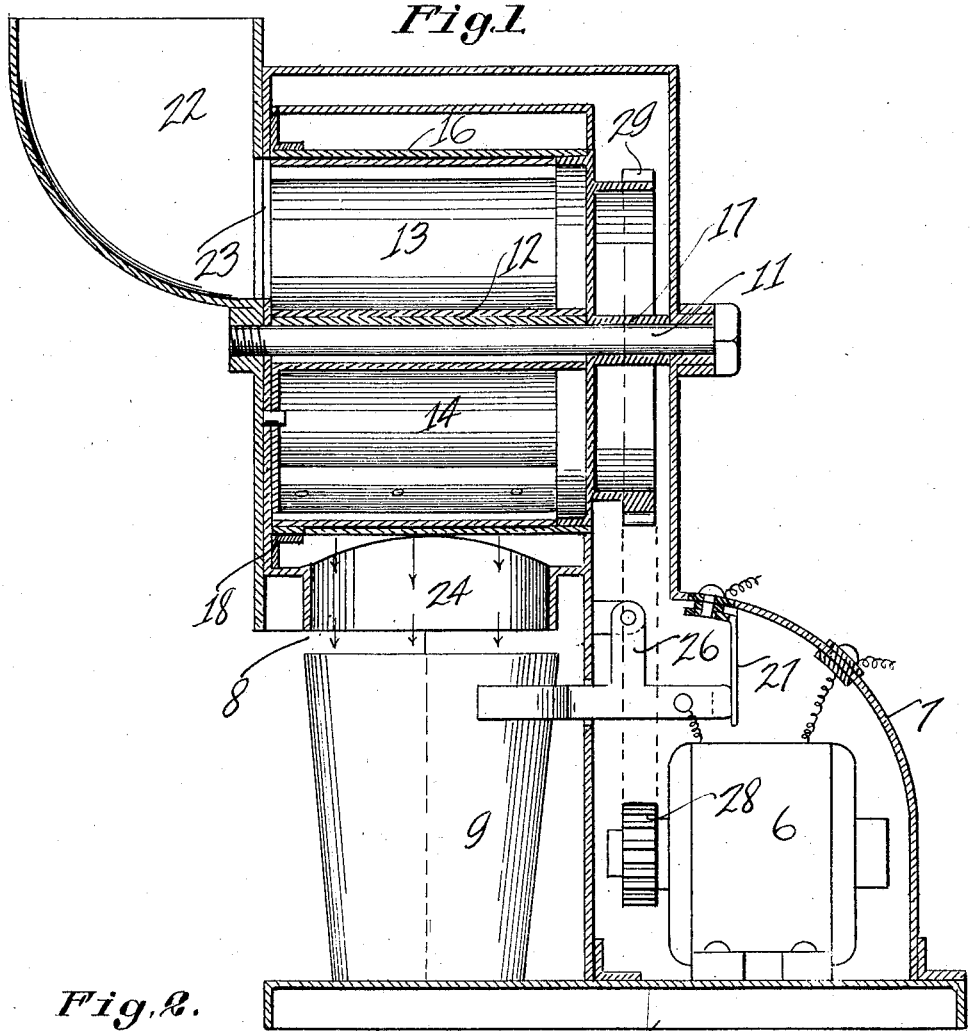
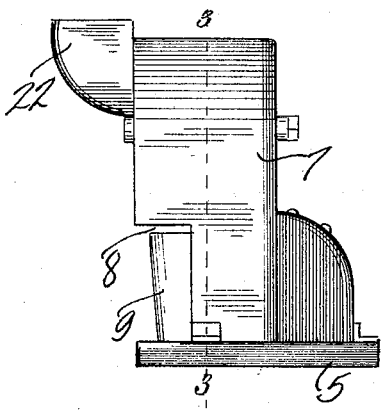
Inventor.
ADOLPH O GOLDSTEIN
By Victor J Evans
attorney Nov. 18, 1930.  A. O. GOLDSTEIN  1,782,296
ICE SHAVING DEVICE
Filed Aug. 16, 1929  2 Sheets-Sheet 2
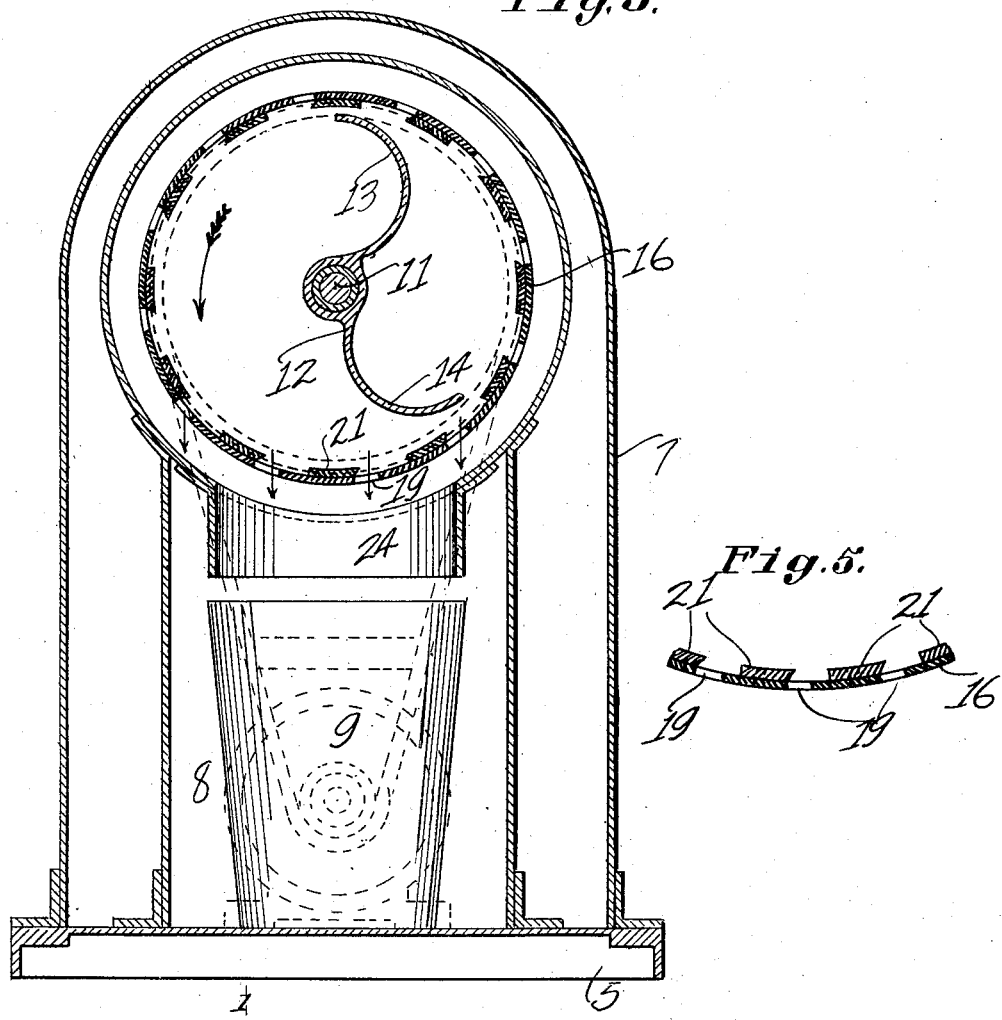
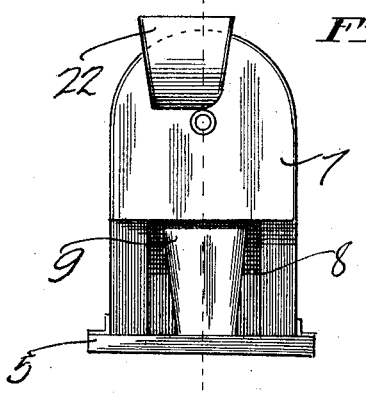
Inventor.
ADOLPH O GOLDSTEIN
By Victor J Evans
Attorney.

Patented Nov. 18, 1930

1,782,296

UNITED STATES PATENT OFFICE

ADOLPH O. GOLDSTEIN, OF SANTA CRUZ, CALIFORNIA, ASSIGNOR TO SNO-KO INC., OF SANTA CRUZ, CALIFORNIA, A CORPORATION OF CALIFORNIA

ICE-SHAVING DEVICE

Application filed August 16, 1929. Serial No. 386,237.

This invention relates to improvements in ice shaving devices.

The principal object of this invention is to provide a unique device for shaving ice to realize an edible ice confection and for the use of ice in beverages and the like wherein the ice is shaved while positioned within a rotating drum.

An additional object is to employ within the drum of the device a stationary baffle so that a positive wedging action of the ice will be realized whereby ice will be retained in a fixed position and can be readily contacted by the internally disposed blades of the rotating drum to thus assure a rapid and positive cutting of the ice to the desired degree of fineness.

A further object is to produce a device which is comparatively small and therefore portable and one which may be placed on a counter with other drink mixing machines.

A still further object is to produce a device which is neat in appearance, durable, economical to manufacture and positive in operation.

Other objects and advantages will be apparent during the course of the following description.

In the accompanying drawings forming a part of this specification and in which like numerals are employed to designate like parts throughout the same, Figure 1 is a vertical cross section on an enlarged scale on the line 1—1 of Figure 4, Figure 2 is a side elevation of the device, Figure 3 is a transverse vertical section on an enlarged scale on the line 3—3 of Figure 2, Figure 4 is a front elevation of the device, and Figure 5 is a fragmentary detail view showing the shaving knives as they appear attached to the rotating drum.

In the mixing of drinks at soda fountains it has been customary to have on hand a quantity of broken ice, which is kept in a receptacle and a small amount scooped out into the drink being dispensed. The result is that the smaller particles of ice rapidly melt leaving only larger pieces which when placed in glasses are still floating in the drink when the same is served to the customer. Many serious accidents have occurred through the customer choking on these pieces of ice and at best the drink is not as pleasant if it is necessary to hold back chunks of ice in the glass.

Applicant has therefore produced a machine wherein the ice is shaved into small chips at the time the drink is served thereby obviating the objections above noted. At the same time this device has a capacity great enough to enable the user to dispense iced flavors as are now common at many beach resorts, the same consisting merely in a quantity of shaved ice upon which a flavoring has been poured, the customer eating this flavored ice in a manner similar to that of a flavored "snowball".

In the accompanying drawings wherein for the purpose of illustration is shown a preferred embodiment of my invention, the numeral 5 designates a base which is adapted to rest upon a counter or other suitable support. Mounted upon the base is a motor 6 having a housing 7 which housing is provided with a recess portion 8 into which the glass or other receptacle, to be filled with the shaved ice, is placed. This glass is designated by the numeral 9. Supported above the glass 9 by the housing 7 is a non-rotating baffle 12 having arms 13 and 14, while surrounding this baffle is a drum 16 journaled as at 17 upon the shaft 11 and upon the annular bearing 18. This drum is provided with slots 19 and has secured to its interior surface adjacent its slots, shaving blades 21.

The numeral 22 designates a hopper that serves to feed ice to the interior of the drum through an opening 23 in the side of the housing. A discharge spout 24 is so arranged that the shaved ice will be dispensed into the glass 9.

As designated to advantage in Figure 1, the numeral 26 designates a switch arm so pivoted, that when the glass 9 engages the same, engagement will be made with the contact 27 completing the electrical circuit to the motor 6. Any convenient means may be employed for connecting the gear 28 of the motor with a gear 29 upon the drum 16. This connecting means is shown on dotted lines of Figures 1 and 3.

The result of this construction is that when a glass is placed in the position shown in the drawings, the same will cause the switch arm to complete the electrical circuit to the motor which will in turn rotate the drum 16 and the attached knives 21. Ice placed in the hopper 22 will pass into the drum and will be pushed by the baffle arm 14 against the surface of the drum. The baffle arm 13 prevents the ice from falling upon the wrong side of the baffle arm 14.

It will thus be seen that it is merely necessary to place ice in the hopper and to place the glass in the device in order to receive within the glass any given quantity of finely shaved ice particles.

From the foregoing description considered in connection with the accompanying drawing it will be obvious that I have devised a unique principle of shaving ice while the same is disposed within a rotating drum, and the feature of employing a baffle that serves to wedge the ice whereby the same will be pushed against the internally disposed rotating blades thus assuring a positive shaving of the ice to the desired degree of fineness.

While I have disclosed a horizontally disposed rotating drum and a stationary baffle, it is obvious that a vertical drum and a rotating baffle could likewise be utilized to accomplish the objects above set forth.

It is to be understood that the form of my invention herewith shown and described is to be taken as a preferred example of the same and that various changes relative to the material, size, shape and arrangement of parts may be resorted to without departing from the spirit of the invention, or the scope of the subjoined claim.

Having thus described my invention, I claim:—

In a device of the character described, a base, a housing positioned on said base, a drum rotatably supported in said housing, a motor supported on said base, said drum being adapted to be rotated by said motor, a recess formed in said housing, a hopper secured to said housing and adapted to feed ice to the interior of said drum, said drum being provided with slots, blades carried by said drum and positioned adjacent said slots, a discharge spout adapted to receive shaved ice from said drum and deposited in a glass positioned within said recess, and a baffle immovably held within said drum, said baffle having arms extending into close proximity with the knives carried by said drum.

In testimony whereof I affix my signature.

ADOLPH O. GOLDSTEIN.